April 17, 1951  J. J. DENHAM  2,549,674
AUTOMATIC FLOW CONTROL APPARATUS
Filed Aug. 10, 1948  2 Sheets-Sheet 1
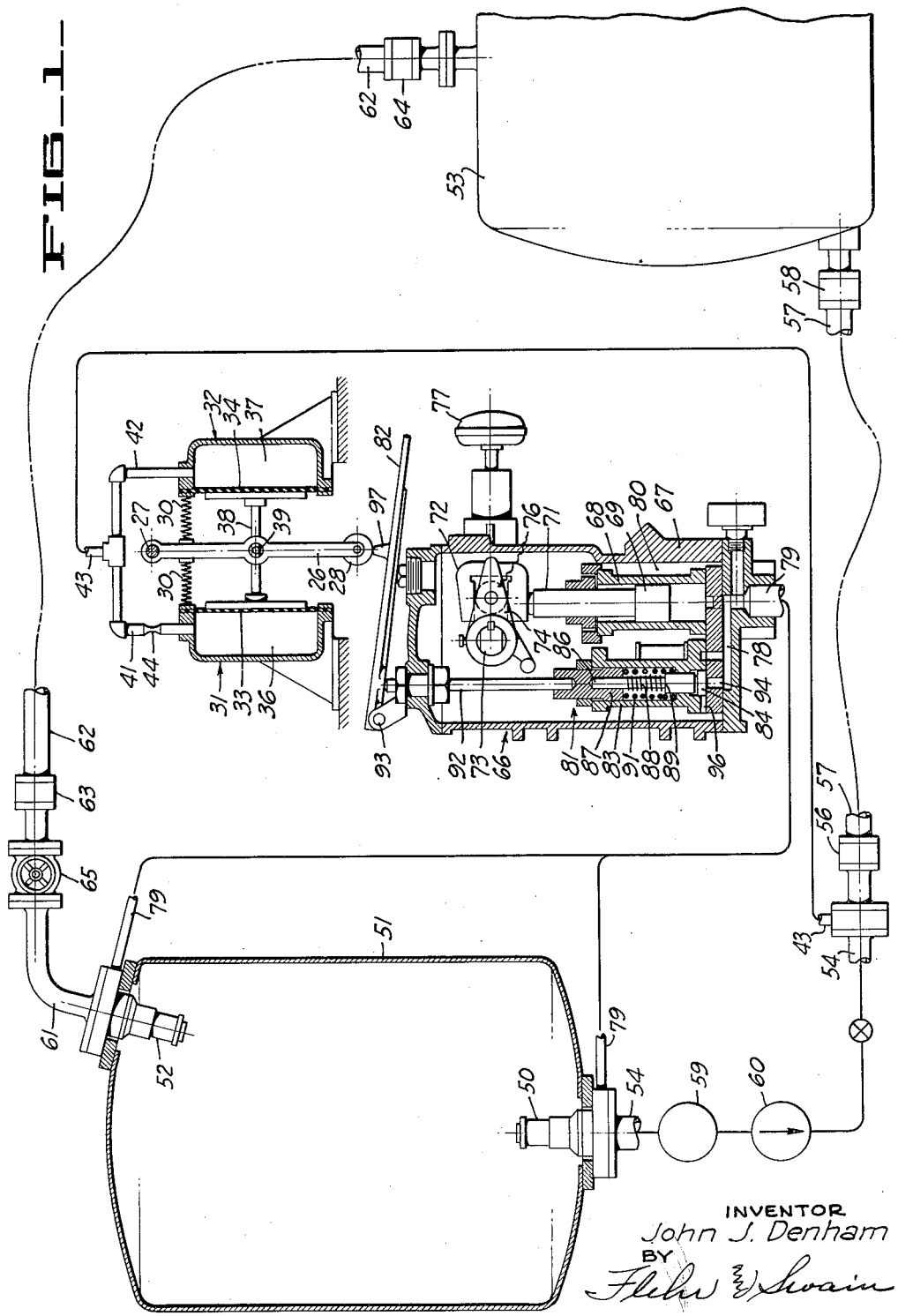
INVENTOR
John J. Denham
BY
ATTORNEYS April 17, 1951     J. J. DENHAM     2,549,674
AUTOMATIC FLOW CONTROL APPARATUS
Filed Aug. 10, 1948     2 Sheets-Sheet 2
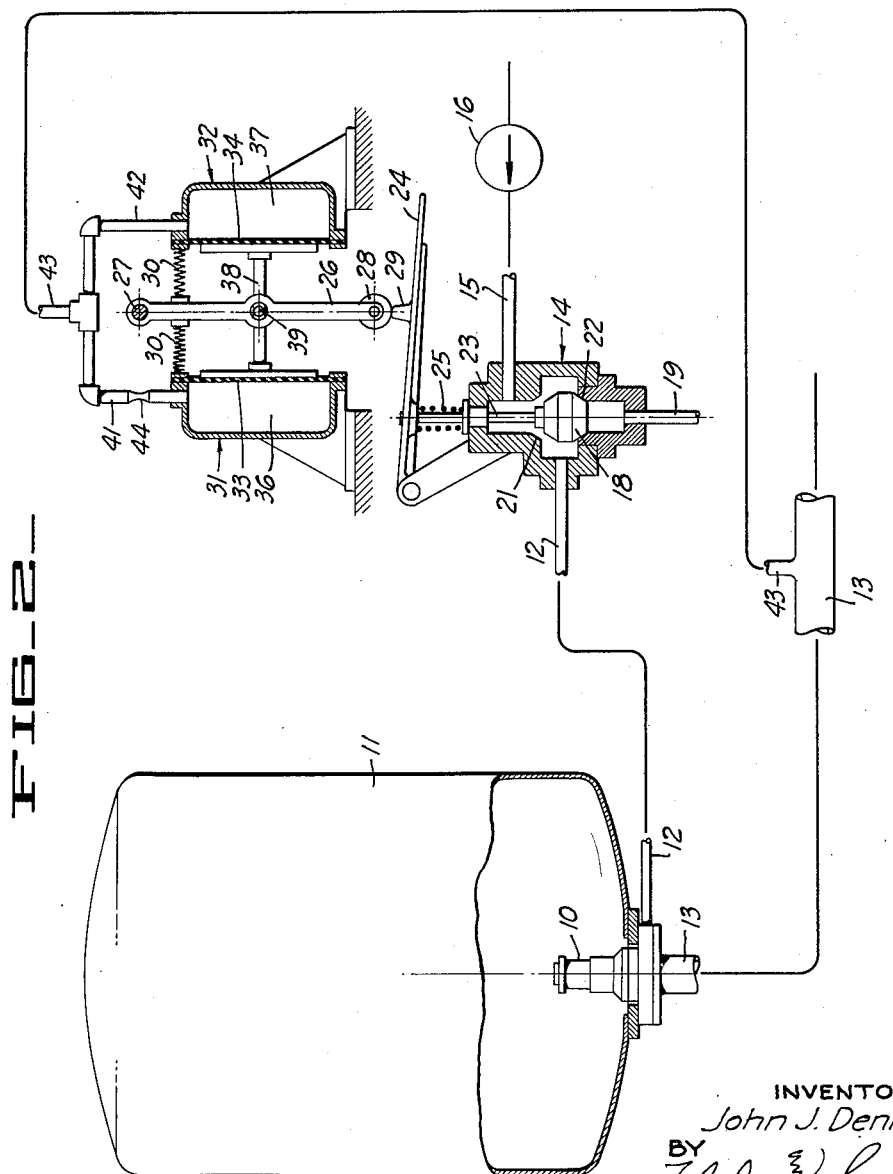
INVENTOR
John J. Denham
BY
ATTORNEYS Patented Apr. 17, 1951

2,549,674

UNITED STATES PATENT OFFICE 2,549,674

AUTOMATIC FLOW CONTROL APPARATUS

John J. Denham, Orinda, Calif., assignor to Shand and Jurs Company, Berkeley, Calif., a partnership Application August 10, 1948, Serial No. 43,425

9 Claims. (Cl. 62—1)

This invention relates generally to systems or apparatus having provision for automatically controlling flow of fluid through a conduit in the event certain abnormal conditions occur, such as breakage which permits free venting of fluid to the atmosphere. The invention is particularly applicable to apparatus for the handling of highly volatile products, such as propane or butane.

The handling of liquefied propane and butane (commonly known in the industry as liquefied petroleum gas) involves serious fire hazards because of the high volatility and inflammable nature of the material, and because the transfer of such products from one tank or receiver to another requires maintenance of considerable pressure to retain the product in liquefied form.

In an effort to minimize the hazards involved, fire underwriters have required the use of so-called excess flow valves in liquefied petroleum gas systems where piping carrying the products is apt to be broken, whereby if such a breakage occurs the line is automatically closed at a point between the break and the pressure source. The valves which have been used for this purpose have been inserted at the inlet end of the line to be protected, and are operated responsive to the differential pressure developed across a flow restriction in the line, to cause an automatic closure.

The use of such valves does not provide all of the features of safety which are desired in many liquefied petroleum gas systems, particularly in systems where a product must be transferred under pressure from one tank to another, as in the filling of smaller tanks from a larger tank source. Such systems are complicated by the use of excess flow valves in addition to the valves which are necessary for the manual control of the system. Furthermore the conventional types of excess flow valves are subject to a number of difficulties. For example they are subject to frequent false operation, and they are troublesome to reset after being closed. Generally they are factory adjusted for operation at a given value of differential pressure, and this adjustment is quite critical and difficult to change during or after installation. The use of a flow restriction in the line restricts flow capacity and may serve as a limiting factor for the entire system.

In general it is an object of the present invention to provide an improved apparatus of the above character which can be relied upon to automatically shut off flow through a line when abnormal flow conditions occur, such as are caused by a conduit breakage.

It is another object of the invention to provide apparatus of the above character which avoids the use of conventional excess flow valves, and which employs the same valve of the system for both manual and automatic shut-off.

Another object of the invention is to provide apparatus of the above character which is not critical as to adjustment, which is not subject to false operation, which can be readily reset, and which is adaptable to a wide range of normal line pressures.

Another object of the invention is to provide apparatus of the above character which does not rely upon a differential operating pressure, and which does not require use of a flow restriction.

Another object of the invention is to provide an improved apparatus of the above character characterized by the use of a fluid pressure operated tank valve which is operated both manually and automatically for controlling flow of fluid from one tank to another, and which serves to automatically shut the tank valve in the event of breakage of a connecting conduit.

Additional objects of the invention will appear from the following description in which the preferred embodiments have been set forth in detail in conjunction with the accompanying drawing.

Referring to the drawing:

Figure 1 is a diagrammatic view illustrating a valve system incorporating the present invention, and employed for the transfer of a liquid petroleum gas from one tank to another.

Figure 2 is a diagrammatic view illustrating a simplified embodiment of the invention.

My invention can best be understood after describing the simplified modification illustrated in Figure 2. In this instance a fluid pressure operated valve unit 10 is shown mounted in the lower wall of a tank or vessel 11. The valve unit may be one of the hydraulic pressure operated type such as are widely used in the petroleum industry, and may for example be constructed as illustrated in Patent No. 2,019,786. The valve member of such valves is urged toward closed position by a spring, but is forced to open position by application of liquid pressure. The unit diagrammatically illustrated receives operating fluid under pressure from the pipe line 12, and has a liquid outlet adapted to be connected to a discharge conduit 13. Line 12 is connected to the vent valve 14, which in turn is connected by line 15 to a source of liquid pressure such as the pump 16.

The diagrammatic vent valve 14 which is illustrated consists of a valve member 18 having two operating positions, one for effectively establishing communication between pipes 15 and 12, and the second for interrupting such communication, and for establishing communication between pipes 12 and 19. Thus the valve member 18 when moved upwardly engages the body seat 21 and when moved downwardly closes upon the seat 22. Upward movement to close on seat 21 interrupts communication between pipes 15 and 12 as previously explained, and downward movement against seat 22 permits communication between pipes 15 and 12, and interrupts communication between the pipes 12 and 19. The operating stem 23, which is attached to valve member 18 is operatively connected with a pivot lever 24, adapted to be operated manually. A compression spring 25 normally urges the valve member upwardly against seat 21, but by applying manual pressure to the lever 24, the valve is moved downwardly against seat 22.

A latch 26 is provided in conjunction with the vent valve 14 to retain the valve member 18 closed against the seat 22, except for certain abnormal conditions as will be presently explained. As diagrammatically illustrated the latch lever 26 is pivoted at 27 to a fixed support, and is provided at its free end with a roller 28 adapted to engage a stud 29 on lever 24. While the roller 28 remains in engagement with stud 29, valve member 18 is held closed against seat 22. However when roller 28 is moved to the left or to the right to free it from the stud 29, the valve member 18 is free to move upwardly under the urge of spring 25, to close against the seat 21. Opposed springs 30 act upon latch 26 to yieldably urge the same to a position with roller 28 directly above stud 29.

Automatic pressure operated means is provided for movement of the latch 26, and this means includes a pair of pressure operated devices 31 and 32. These devices may employ flexible diaphragms 33 and 34, which are adapted to be moved by fluid pressures applied to the chambers 36 and 37. A thrust link or rod 38 connects both of the diaphragms 33 and 34 in opposition, and a point 39 on this thrust rod is connected to the link 26. Chambers 36 and 37 are connected by the pipes 41 and 42 to the common pipe 43, which leads to a source of controlling pressure, in this instance a suitable point along the conduit 13. One of the pipe connections 41, 42 is provided with a flow restriction 44 which may be adjustable.

Operation of the apparatus shown in Figure 2 is as follows: It is assumed that the tank 11 contains a liquefied petroleum gas under considerable pressure, and that it is desired to convey this product through the conduit 13 to some point of final discharge, as for example a second tank. The operator holds lever 24 in its lowermost position, to close the valve 18 upon seat 22. Pump 16 is caused to deliver fluid under pressure to the valve unit 10, whereby this valve is opened to permit liquid from the tank 11 to pass through the conduit 13. Within a short interval flow conditions through the conduit 13 will become stabilized, and then a substantially constant pressure will be applied through the pipe 43 to both the pressure operated devices 31 and 32. These devices, acting in opposition upon the latch 26, maintain the latch 26 in a centralized position directly in engagement with the stud 29. The operator may now release the lever 24, and thereafter rely upon the latch 26 to hold the lever in position.

If a remote portion of the conduit 13 should be broken, there will be an excess flow of liquid and an abrupt drop in static pressure which is transmitted through pipe 43. Because of the flow restriction 44, the fluid in chamber 37 quickly vents to this lower pressure value, but because a considerable time interval is required for venting of fluid from chamber 36 through the flow restricting orifice 44, the pressure in the latter is retained for an appreciable time period. The resulting difference in the pressures in the chambers 36 and 37 causes the diaphragms 33 and 34 to exert a differential force urging the latch lever 26 to the right as viewed in Figure 2, to disengage the roller 28 from the stud 29. Tripping of the latch in this manner permits the valve member 18 to move upwardly and close upon the seat 21, with the result that pipe 12 is disconnected from the pump 16, and is vented through pipe 19. This in turn causes immediate closure of the tank valve unit 10, to interrupt further flow of liquid.

In order to reset the apparatus, after there has been an automatic shut-off, it is only necessary to repair the broken conduit, after which one proceeds as previously explained to again open the valve 10.

In connection with the apparatus shown in Figure 2, it should be understood that the pump 16 is representative of a source of fluid under pressure, preferably liquid, and this source may be a pump which is started and stopped as desired, a continuously operating pump having a suitable manual valve for controlling its discharge, a pump manually operated by a handle, or a storage tank containing fluid under pressure, and having its outlet controlled by a manually operated valve. For normal closing of valve 10 a separate vent valve can be provided for line 12, or latch lever 26 can be manually disengaged from lever 24.

As described above the apparatus is operated responsive to a sudden drop in controlling pressure. However a sudden increase in pressure applied through pipe 43 will likewise cause lateral movement of latch lever 26, because such a pressure change is immediately transmitted to device 32, while increase in pressure in device 31 is delayed. Thus the apparatus can be operated automatically responsive to any sudden pressure change, or if this is not desired, release movement of lever 26 can be restricted to one direction by a suitable stop, so that for example it is moved to released position responsive only to a sudden pressure drop.

Valve apparatus of the type described above has many advantages over the use of conventional excess flow control valves. Particularly, instead of being operated responsive to a differential pressure across an orifice or like flow restriction in the main flow pipe, the apparatus is responsive to a sudden or abrupt drop in the line pressure. Thus the apparatus does not require critical adjustment with respect to the maintenance of a differential pressure across an orifice, as with conventional excess flow control valves, and in fact the normal operating pressure may be any pressure over a relatively wide range. Irrespective of the normal operating pressure which is used, a breakage in the system, which necessarily is accompanied by an abrupt drop in line pressure, causes the force applied by operating device 32 to exceed that applied by device 31, to trip the latch lever 26. After an automatic closure of the valve 10 the resetting operation is relatively simple as previously explained. Because of the characteristics just described no critical factory adjustments are required, and the same apparatus, without changes or adjustments at the factory or at the time of installation, can be used in a wide variety of fluid systems, and over a wide variety of normal pressures.

It will be evident that the system of Figure 2 can be applied to control the flow of various types of liquids and gases. However because of its characteristics and effectiveness it is of particular value as applied to liquefied petroleum gas.

Figure 1 illustrates a more specific application for the control of liquefied petroleum gas. In this instance the fluid pressure operated valve 50 is mounted in the lower wall of the tank 51, and the upper portion of this tank is also provided with a fluid pressure operated vapor control valve 52. Both valves 50 and 52 can be of the same general type as the valve 10. It is presumed that the tank 51 serves the purpose of storing liquefied petroleum gas, which is to be transferred to a receiving tank 53. Tank 53 may represent for example a tank mounted upon a motor vehicle, or railroad car, or it may represent a consumer's tank, with the tank 51 mounted upon a motor vehicle. The liquid discharge conduit 54 leading from valve 50 is connected by coupling 56 to the hose 57, which in turn is connected by coupling 58 to the receiving tank 53. Certain auxiliary equipment is also shown connected in the pipe 54, including in this instance the meter 59, and the liquid pump 60.

The vapor control valve 52 is connected by line 61 to the upper portion of the receiving tank 53, through the flexible hose 62, and the couplings 63 and 64. Manually operated valve 65 may also be inserted in line 61. The purpose of line 61 is to equalize the vapor pressures within the tanks 51 and 53.

The source of pressure for operating both of the valves 50 and 52 is a manually operated hydraulic pump or operator 66. Briefly this device consists of a housing 67, which encloses and mounts the hydraulic cylinder 68. The piston 69 operating within the cylinder is connected to a piston rod 71 which in turn has a yoke 72 attached to its upper end. A shaft 73 carries an arm 74, provided with a roller 76 which is accommodated within the yoke 72. An external operating handle 77 is attached to shaft 73. A duct 78 in the base of the housing connects with the line 79 which leads the valve units 50 and 52, and also this duct connects with the cylinder space below the piston 69. A check controlled duct (not shown) extends through the piston, and when the handle 77 is in its uppermost position, the space below the piston is vented to the liquid reservoir 80.

The operator also includes a relief valve assembly 81 which has an operating connection with a second lever 82. The assembly 81 consists of a guide sleeve 83, within the lower portion of which is a movable valve member 84. This valve member is secured to the lower end of a rod 86, the upper end of which is slidably fitted within the bushing 87. A compression spring 88 acts between the bushing 87 and a shoulder 89 upon the valve rod 86, thus tending to urge the valve member 84 toward closed position. Another compression spring 91 acts between the bushing 87 and a shoulder formed on the sleeve 83, and serves to urge the bushing 87 upwardly.

A rod 92 slidably extends through the cover of the housing 67, and has its lower end extending within the bushing 87. The upper exterior end of the rod 92 is operatively connected with the lever 82, and the latter is pivoted at 93 so that the free end of the lever is movable in a vertical direction.

Duct 78 has an extension 94 which leads to the under side of the stationary seat for the valve member 84. Another duct 96 leads from the valve seat to the liquid reservoir 80 within the housing 67.

By manipulation of the handle 77, the operator 66 serves to deliver liquid under pressure, to the line 79, and this pressure can be maintained until it is desired to permit the associated pressure operated valves to close. During the period that one desires to maintain pressure in the line 79, it is necessary to maintain manual pressure upon the lever 82. Downward pressure applied to the lever 82 is transmitted through rod 92, sleeve 87, and compression spring 88 to the valve member 84. Thus this valve member is held closed upon its seat to maintain a sufficient operating pressure in line 79. If for some reason the pressure should become excessive, excess pressure is relieved by upward movement of the valve member 84 against the compression spring 88. If one does not maintain downward manual force upon the lever 82, then this lever takes an upper normal position, so that valve 84 is free to move upwardly, thus making it impossible to develop or maintain sufficient pressure in line 79 to operate an associated valve.

The remainder of the apparatus, including the pressure operated devices 31 and 32, is the same as in Figure 2. The line 43, which connects with both of the devices 31 and 32, makes connection with the conduit 54 at a point on the inlet side of the hose coupling 56.

Operation of the apparatus shown in Figure 1 is as follows: Assuming that one wishes to transfer a liquefied petroleum product, such as propane or butane, from the tank 51 to tank 53, the liquid and vapor hose connections are made as illustrated, the valve 65 is opened, and pump 60 placed in operation. Lever 82 is depressed manually and the operator manipulates the hand lever 77 to apply sufficient liquid under pressure to the line 79 to effect opening of both the valves 50 and 52. The operation of these valves is necessarily accompanied by a sudden rise in pressure in the line 54. This sudden rise in pressure will result in initial unequal pressures in the devices 31 and 32, because of the flow restriction 44. Thus the latch lever 26 will be momentarily moved to the left and in a disengaged position with respect to the stud 97. The operator however continues to hold the lever 82 down and within a short interval the pressures in devices 31 and 32 become equalized, thus causing the latch 26 to assume the engaged position illustrated in Figure 1. The operator then releases the lever 82 while filling of tank 53 proceeds. Assuming that during the transfer operation no abnormal abrupt change in the line pressure occurs, then the latch lever 26 remains in its engaged position, so that when the valves 50 and 52 are to be closed, this must be done by a manual closing operation, such as by returning the lever 82 to its raised position, or by manually moving the latch lever 26 to disengage the lever 82. Assuming however that an abnormal drop in line pressure occurs, which may be due to breakage of the couplings 56, 58, 63 or 64, or the hoses 57 or 62, then the vapor pressure in device 32 is reduced rapidly, because of the absence of any flow restriction in the pipe connection 42, while the pressure within the device 31 is maintained for a substantial interval, due to the restriction 44. As a result the forces applied by the devices 31 and 32 upon the latch lever 26, are unequal, and this lever is moved to the right as viewed in Figure 1 to disengage the same from the lever 82. As previously explained the release of lever 82 immediately vents liquid from the line 79, thus causing immediate automatic closure of the valves 50 and 52. Closure of these valves completely protects the system insofar as the source of liquefied petroleum gas is concerned.

It will be evident that the valve apparatus of Figure 1 has many advantages over other types of safety devices which have been used for this purpose, including the excess flow valves previously described. An operator is apprised at all times of the operative condition of the safety features, particularly since it is necessary for the devices 31 and 32, and the latch lever, to operate in conjunction with manual operation of the valves 50 and 52. The same apparatus is applicable to a wide variety of liquefied gas systems, without making critical adjustments either at the factory or in the field.

While Figure 1 illustrates a system in which liquid is pumped from one tank to the other, the invention is equally applicable to systems in which the liquid is transferred under pressure by gravity flow, or by application of vapor pressure.

I claim:

1. In automatic valve apparatus, valve means adapted to control flow of fluid, and means responsive to a sudden pressure change of a controlling pressure for effecting automatic operation of said valve means, said last means including a pair of pressure operated devices connected in opposition, and fluid connections between both said devices and said controlling pressure, one of said connections having a greater flow restriction.

2. In automatic flow control apparatus, means including a valve adapted to be actuated to shut off flow of fluid through a system, means including a latch serving to retain said valve in one operating position and adapted to be tripped to cause the valve to assume a second operating position, and operating means for said latch comprising a pair of fluid pressure operated devices mechanically connected in opposition to said latch, and fluid connections from said devices to a common source of controlling pressure, one of said fluid connections having a flow restriction whereby when a sudden pressure change occurs in said controlling pressure, one of said devices exerts force against said latch greater than the other to trip the latch.

3. In automatic flow control apparatus adapted for use with a vessel, a valve unit disposed to control flow of fluid from the vessel and adapted to be operated by application of fluid pressure to open the same, a discharge conduit line connected to said valve unit for conveying fluid when the valve unit is open, a connection from said valve unit to a source of fluid pressure for operating the same, and means for venting fluid from said connection responsive to a sudden abnormal pressure drop in a source of controlling fluid pressure.

4. In flow control apparatus adapted for use with a vessel, a valve unit adapted to be mounted in one wall of the vessel and adapted to be operated by application of fluid pressure to open the same, a discharge conduit line connected to said valve unit for conveying fluid from the vessel when the valve is open, a connection from said valve unit to a source of pressure for operating the same, and vent valve means having open and closed operating positions and serving to vent fluid from said connection when in open position, latch means for retaining said valve means in its closed position, and means for automatically tripping said latch means to permit said valve to move to its open position responsive to a sudden drop in pressure at a point in said conduit line.

5. Apparatus as in claim 4 in which said last means comprises a pair of fluid pressure operated devices, said devices being connected in opposed relationship to said latch means, each of said devices having a closed fluid chamber adapted to receive fluid under pressure to apply force to said latching means, and fluid connections from both said devices to said point in said conduit, one of said connections including flow restricting means.

6. In apparatus of the character described adapted to be used with a vessel containing a liquid under pressure, a valve unit adapted to communicate with the vessel and adapted to be operated between open and closed positions by application of fluid pressure to the same, a discharge conduit connected to said valve unit for conveying liquid from the tank when the valve unit is open, a controlling connection from said valve unit to a hydraulic operator for operating the same, vent valve means having open and closed operating positions and serving to vent liquid from said controlling connection when in open position, manually operable means for positioning said vent valve means in its closed position, latch means for retaining said valve means in its closed position, and means for automatically tripping said latch means to cause said valve means to move to its open position responsive to a sudden pressure change in said conduit, to thereby cause automatic closure of said valve unit.

7. In automatic valve apparatus, valve means to control flow of fluid, trip means to effect operation of said valve, and means responsive to a sudden pressure change of a controlling pressure for effecting automatic operation of said trip means, said last means including a pair of pressure operated devices mechanically connected in opposition as well as to said trip means, and fluid connections between both said devices and said controlling pressure, one of said connections having a flow restriction.

8. In automatic flow control apparatus, means including a valve adapted to be actuated to shut off flow of fluid through a system, the system including a conduit connected to the outflow side of the valve, said valve being adapted to be operated by application of fluid pressure to the same to open and close said valve, a second valve serving to control application of fluid pressure to said first named valve, means serving to retain said second valve in one operating position and adapted to be tripped to cause the valve to assume a second operating position, operating means for said last named means comprising a pair of fluid pressure operated devices mechanically connected in opposition, and fluid connections from said devices to said conduit, one of said fluid connections having a flow restriction whereby when a sudden pressure change occurs in said conduit, one of said devices exerts a force greater than the other to cause said second valve to be tripped.

9. In automatic flow control apparatus, means including a valve adapted to be actuated to shut off flow of fluid through a system, means including a latch serving to retain said valve in one operating position and adapted to be tripped to cause the valve to assume a second operating position, and fluid connections to said last named means from said system at a point on the discharge side of said valve.

JOHN J. DENHAM.

REFERENCES CITED

The following references are of record in the file of this patent:

UNITED STATES PATENTS

| Number | Name | Date |
|---|---|---|
| 625,118 | Miller | May 16, 1899 |
| 1,801,750 | McEachern | Apr. 21, 1931 |
| 1,829,020 | Shield | Oct. 27, 1931 |
| 2,360,889 | Philbrick | Oct. 24, 1944 |